(12) United States Patent
Oh

(10) Patent No.: US 7,570,336 B2
(45) Date of Patent: Aug. 4, 2009

(54) DISPLAY DEVICE WITH PIEZOELECTRIC MATERIAL AND METHOD FOR FABRICATING THE SAME

(75) Inventor: Tae Young Oh, Gyongki-do (KR)

(73) Assignee: LG Display Co., Ltd., Seoul (KR)

( * ) Notice: Subject to any disclaimer, the term of this patent is extended or adjusted under 35 U.S.C. 154(b) by 490 days.

(21) Appl. No.: 11/116,201

(22) Filed: Apr. 28, 2005

(65) Prior Publication Data

US 2005/0243258 A1 Nov. 3, 2005

(30) Foreign Application Priority Data

Apr. 29, 2004 (KR) .................. 10-2004-0030055

(51) Int. Cl.
*G02F 1/1343* (2006.01)

(52) U.S. Cl. .................. 349/143; 349/142; 257/295; 257/751

(58) Field of Classification Search ............... 349/142, 349/143; 257/295, 751
See application file for complete search history.

(56) References Cited

U.S. PATENT DOCUMENTS

| | | | | |
|---|---|---|---|---|
| 5,572,052 A | * | 11/1996 | Kashihara et al. | 257/295 |
| 5,828,129 A | * | 10/1998 | Roh | 257/751 |
| 5,965,942 A | * | 10/1999 | Itoh et al. | 257/761 |

\* cited by examiner

*Primary Examiner*—Julie Ngo
(74) *Attorney, Agent, or Firm*—McKenna Long & Aldridge LLP

(57) ABSTRACT

The present invention discloses a display device having a gate line and a data line crossing each other on a substrate to define a pixel region, a thin film transistor at each crossing of the gate line and data line, a pixel electrode about a circumference of the pixel region and having an opening at a central portion of the pixel region, the pixel electrode electrically connected to the thin film transistor, a piezoelectric lead lanthanum zirconate titanates (PLZT) layer in the opening of the pixel region, and a piezoelectric lead zirconate titanates (PZT) layer between the pixel electrode and the PLZT layer.

29 Claims, 12 Drawing Sheets

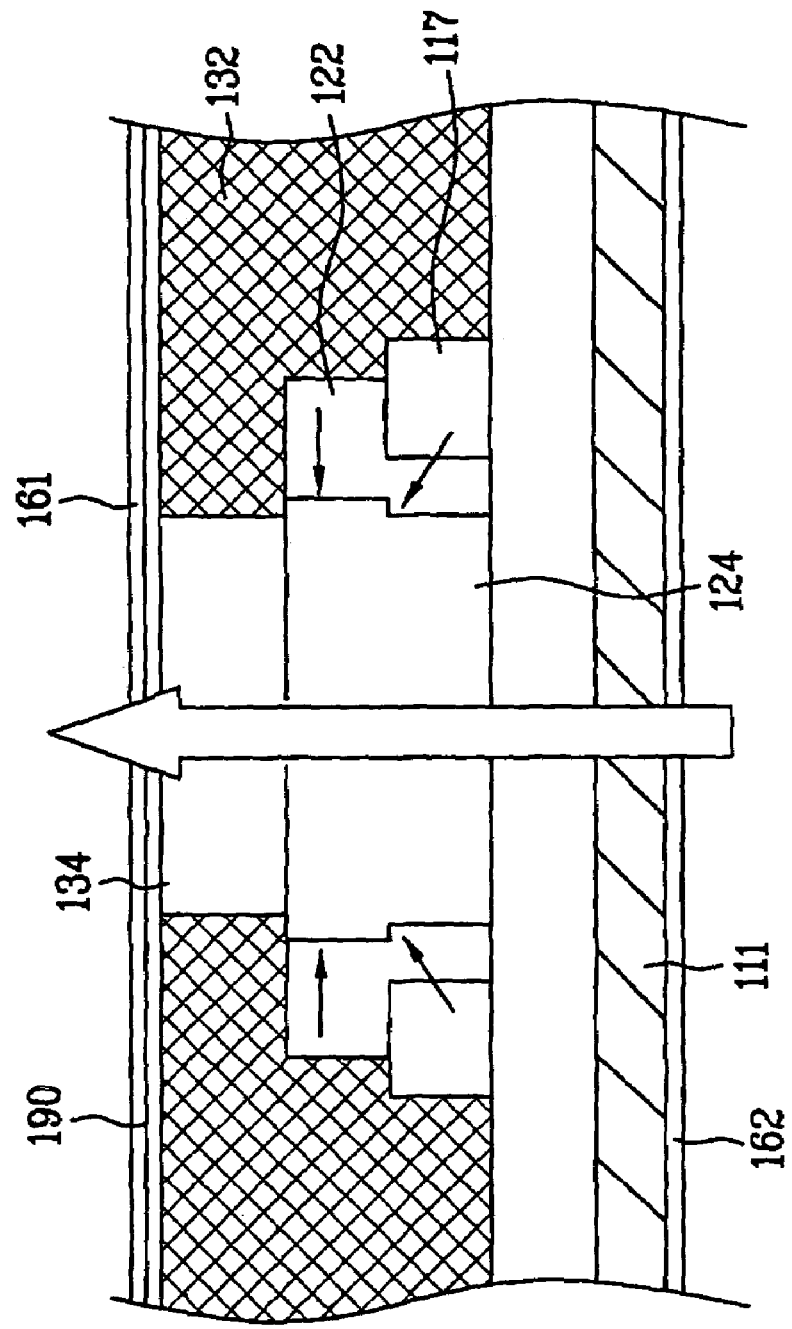

DISPLAY DEVICE WITH PIEZOELECTRIC MATERIAL AND METHOD FOR FABRICATING THE SAME

This application claims the benefit of Korean Application No. P2004-0030055 filed on Apr. 29, 2004, which is hereby incorporated by reference.

BACKGROUND OF THE INVENTION

1. Field of the Invention

The present invention relates to a display device for displaying a picture, and more particularly, to a display device utilizing a piezoelectric material and a method for fabricating the same.

2. Discussion of the Related Art

A liquid crystal display (LCD) device, a flat panel display devices, has drawn attention as a substitute for a cathode ray tube. The LCD is a device in which an electric field is applied to liquid crystal, which has fluidity of liquid and optical properties of crystal, in order to vary optical anisotropy of the liquid crystal. The LCD has been widely used as a display device because it consumes less power, is compact, and can be produced with a relatively large screen. In addition, the LCD can realize a high definition picture.

The LCD device is provided with an upper substrate (often referred to as a color filter substrate), and a lower substrate (often referred to as a thin film transistor substrate), both of which are arranged opposite to each other. Liquid crystal having a dielectric anisotropy is disposed between the first and second substrates for displaying a picture by utilizing transmittivity of light varied by changing orientation of the liquid crystal.

A twisted nematic (TN) type of liquid crystal is used mostly in fabricating an LCD device. The TN type requires an alignment film to control the initial orientation of the liquid crystal. Alignment films are formed on the inside surfaces of each of the upper and lower substrates. Their alignment directions are determined by rubbing in different directions.

On the outside surfaces of the two substrates, there are polarizing plates, of which the transmission axes are set to be either a normally black mode (hereafter referred to as an NB mode) or a normally white mode (hereafter referred to as an NW mode). For an example, a 90° TN LCD is fabricated by rubbing the alignment films of the upper and lower substrates with a 90° difference and filling nematic liquid crystal mixed with cholesteric liquid crystal to form a liquid crystal layer having a thickness of 4~8 μm and a 60~100 μm pitch between the lower and upper substrates. Thereafter, a mode of operation (either an NB mode or an NW mode) is determined by tweaking the axes of transmittivity of the polarizing plates attached to the outside surfaces of the upper and lower substrates.

In the NB mode, screen is dark if no voltage is applied thereto, and screen is bright if a voltage higher than the threshold voltage is applied thereto. Conversely, in the NW mode, screen is bright if no voltage is applied thereto, and screen is dark if a voltage higher than the threshold voltage is applied thereto. A picture can be displayed in LCD devices by using such a principle.

FIG. 1 illustrates a cross-section of the related art liquid crystal display device, FIG. 2 illustrates a plan view of the related art liquid crystal display device, and FIGS. 3A and 3B illustrate perspective views each showing the driving principle of the related art liquid crystal display device.

Referring to FIG. 1, the related art liquid crystal display device is provided with a first substrate 1 having a color filter layer 12 formed thereon for producing color, a second substrate 2 having switching devices (i.e., thin film transistors (TFTs) for shifting orientation of liquid crystal molecules, and a liquid crystal layer between the first and second substrates 1, and 2.

On the first substrate 1, there are a color filter layer 12 at each of pixel regions for producing color, a black matrix layer 11 at portions except for the pixel regions to shield light, and a common electrode 13 to apply a voltage to the liquid crystal layer 3.

Referring to FIG. 2, on the second substrate 2, there are a plurality of gate lines 32 and data lines 35 perpendicular to one another to define sub-pixel regions. A plurality of pixel electrodes 22 that are electrically connected to each TFT are formed to apply a voltage to the liquid crystal layer at the pixel regions. Also, there are a plurality of thin film transistors TFT at cross portions of the gate lines 32 and the data lines 35.

In addition, the second substrate 2 has a storage capacitor electrode 36 which is overlapped the pixel electrode 22 for sustaining a voltage charged to the liquid crystal layer 3 during the turn-off period of the thin film transistor.

Between the first and second substrates 1, and 2, spacers 15 maintain a gap between the two substrates. At the edges of the substrates, there is sealant 16 to prevent the liquid crystal from flowing out, and to attach the first and second substrates 1 and 2 together.

In the foregoing liquid crystal display panel, a desired molecular arrangement can not be obtained by placing the liquid crystal only between the two substrates 1 and 2. Thus, it is essential that the first and second alignment films 51 and 52 be formed on the inside walls of the substrates in contact with the liquid crystal.

In a method for forming the alignment film, an organic polymer thin film is formed on the substrate by the processes of printing and hardened and the film is rubbed to control the orientation of the liquid crystal molecules. Alternatively, there is a photo-orientation method which can be performed without physical contact, such as rubbing. Also, a static electricity can be avoided in the photo-orientation method if a photo-sensitive alignment film is used. Thus, the initial orientation of the liquid crystals is determined by rubbing the alignment film in a direction, or directing a polarized ultra-violet beam.

First and second polarizing plates 61, and 62 are attached to the outside surfaces of the first and second substrates 1 and 2 such that polarization axes thereof are perpendicular to each other. The polarizing plates are essential and important components for providing transmissive light in a predetermined direction. More specifically, by rubbing the first and second alignment films on the inside surfaces of the first and second substrates 1 and 2 perpendicular to each other, the liquid crystal molecules are initially twisted. In this instance, the arrangement of the liquid crystal molecules can be twisted because the liquid crystal close to the surface of the alignment film is orientated in a direction the same as the rubbing direction of the alignment film, so that a vertical alignment is performed.

Referring to FIG. 3A, the transmissive axes of the first and second polarizing plates 61, and 62 attached to the outside surfaces of the first and second substrates 1 and 2 are also perpendicular to each other. The directions of the transmissive axes of the first and second polarizing plates 61, and 62 and the directions of rubbing of the first and second alignment films are disposed in parallel, respectively. Therefore, the light incident from a vertical direction on the second substrate 2 is polarized at the second polarizing plate 62, turned by 90° following the twist of the liquid crystal molecules 3 while the light passes through the liquid crystal, and passes through the first polarizing plate 61 to display a picture.

Referring to FIG. 3B, if a voltage higher than a predetermined value is applied to the device, an electric field is formed between the common electrode and the pixel electrode, to re-orient the liquid crystal molecules parallel to the direction of the electric field. Accordingly, because the light incident from the vertical direction on the second polarizing plate 62 is polarized, passes a liquid crystal cell in parallel and fails to pass through the first polarizing plate 61. As a result, the light fails to display a picture. Thus, the liquid crystal serve as a shutter that cuts off light by applying a voltage thereto.

That is, if no voltage is applied to the device, the liquid crystal 3 are arranged as shown in FIG. 3A, to display the white state. If a voltage higher than a threshold value is applied to the device, the liquid crystal 3 is arranged parallel to the electric field as shown in FIG. 3B, to display the black state. By using this principle, black can be displayed on the white base. Conversely, white can be displayed on the black base.

However, the related art liquid crystal display device has the following problems. First, in fabricating a display device by applying the liquid crystal thereto, the alignment films are required for initial orientation of the liquid crystal. However, the alignment film can be contaminated such that their performance is affected. Also, alignment performance can be deteriorated by process steps before or after forming the alignment film, thereby resulting in decreasing yield. Second, due to the nature of fabrication process, such as the steps of forming various patterns on two substrates opposite to each other and forming a liquid crystal layer therebetween, there is a high probability in manufacturing failure in each manufacturing step. Third, there are many problems in view angle, response speed, residual image, and light leakage that can be caused by inconsistent viscosity and initial orientation of the liquid crystal molecules, thereby deteriorating the picture quality of the display device.

SUMMARY OF THE INVENTION

Accordingly, the present invention is directed to a display device, and a method for fabricating the same that substantially obviates one or more problems due to limitations and disadvantages of the related art.

An object of the present invention is to provide a display device made of a piezoelectric material, and a method for fabricating the same, which can overcome problems of the liquid crystal display device by simplifying a fabrication process.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a display device includes a gate line and a data line crossing each other on a substrate to define a pixel region, a thin film transistor at each crossing of the gate line and data line, a pixel electrode about a circumference of the pixel region and having an opening at a central portion of the pixel region, the pixel electrode electrically connected to the thin film transistor, a piezoelectric lead lanthanum zirconate titanates (PLZT) layer in the opening of the pixel region, and a piezoelectric lead zirconate titanates (PZT) layer between the pixel electrode and the PLZT layer.

In another aspect of the present invention, a method for fabricating a display device including forming a gate line and a data line perpendicular to each other on a substrate to define a pixel region, forming a thin film transistor at each crossing of the gate line and the data line, forming a protective film on an entire surface including the thin film transistor, forming a pixel electrode about a periphery of the pixel region such that the pixel region has an open portion at a central portion thereof, the pixel electrode is connected to the thin film transistor, forming a PZT layer on the protective film adjacent to the pixel electrode and to overlap a portion of the pixel electrode, and forming a PLZT layer at the opened portion of the pixel electrode.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings;

FIGS. 6A and 6B illustrate cross-sectional view of each showing the driving principle of the display device in accordance with an embodiment of the present invention;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
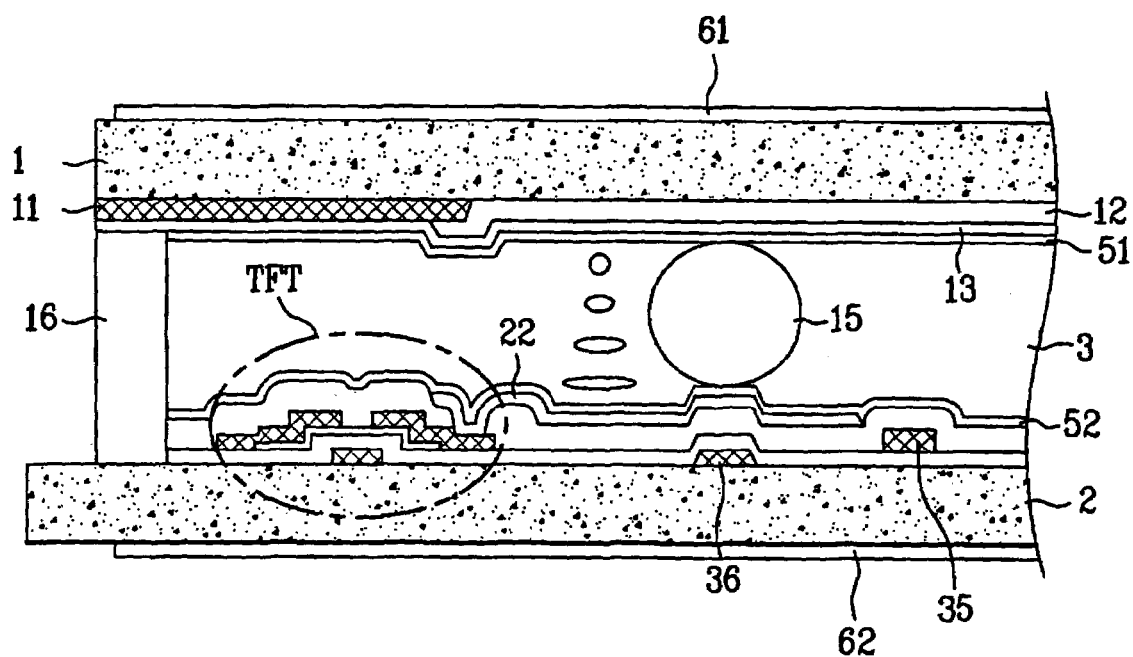
FIG. 1 illustrates a cross-sectional view of the related art liquid crystal display device.
Figure 2:
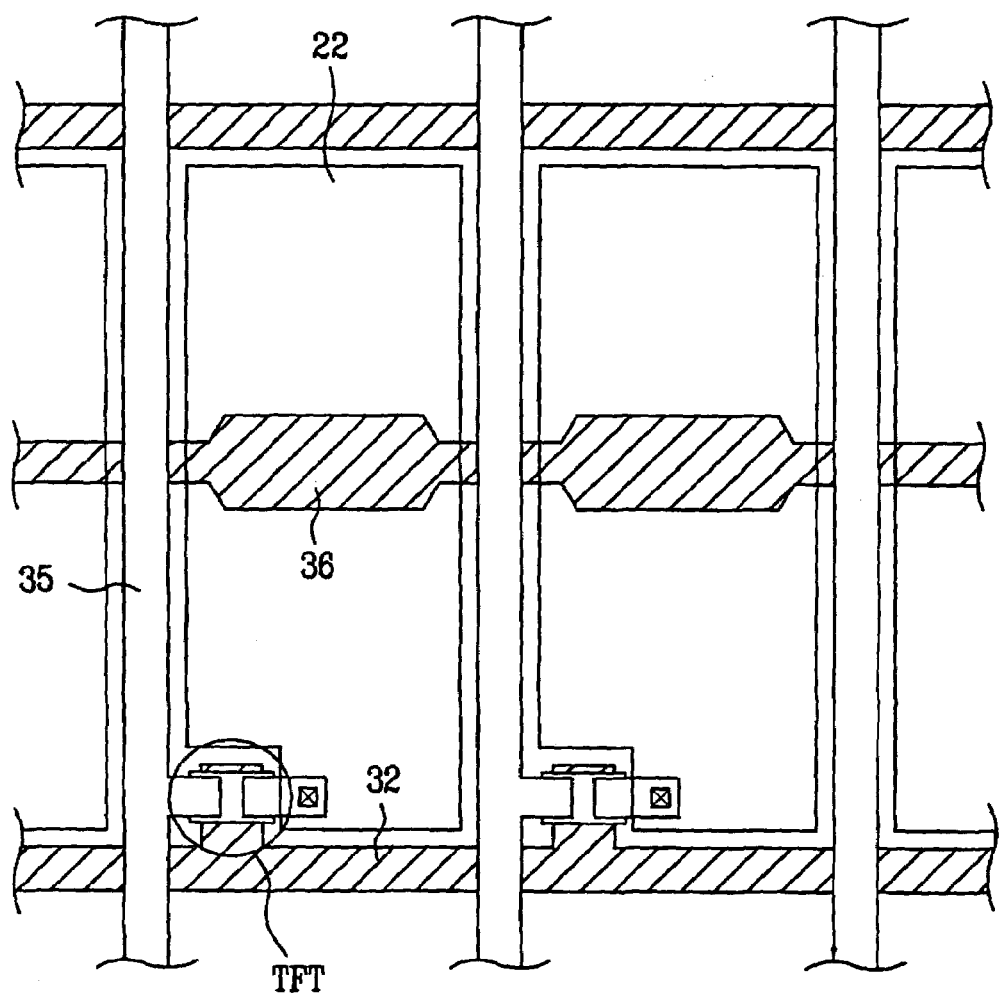
FIG. 2 illustrates a plan view of the related art liquid crystal display device.
Figure 3A:
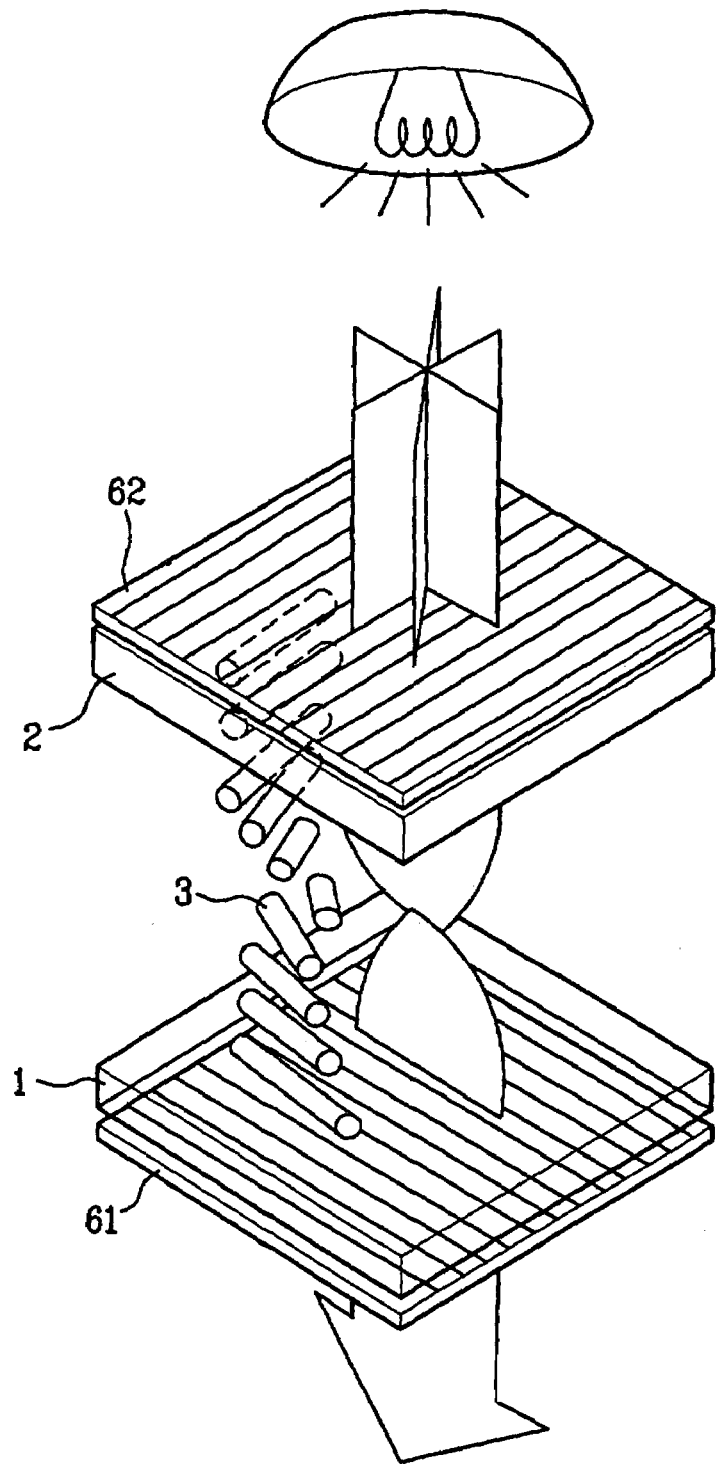
FIGS. 3A and 3B illustrate perspective views each showing the driving principle of the related art liquid crystal display device.
Figure 3B:
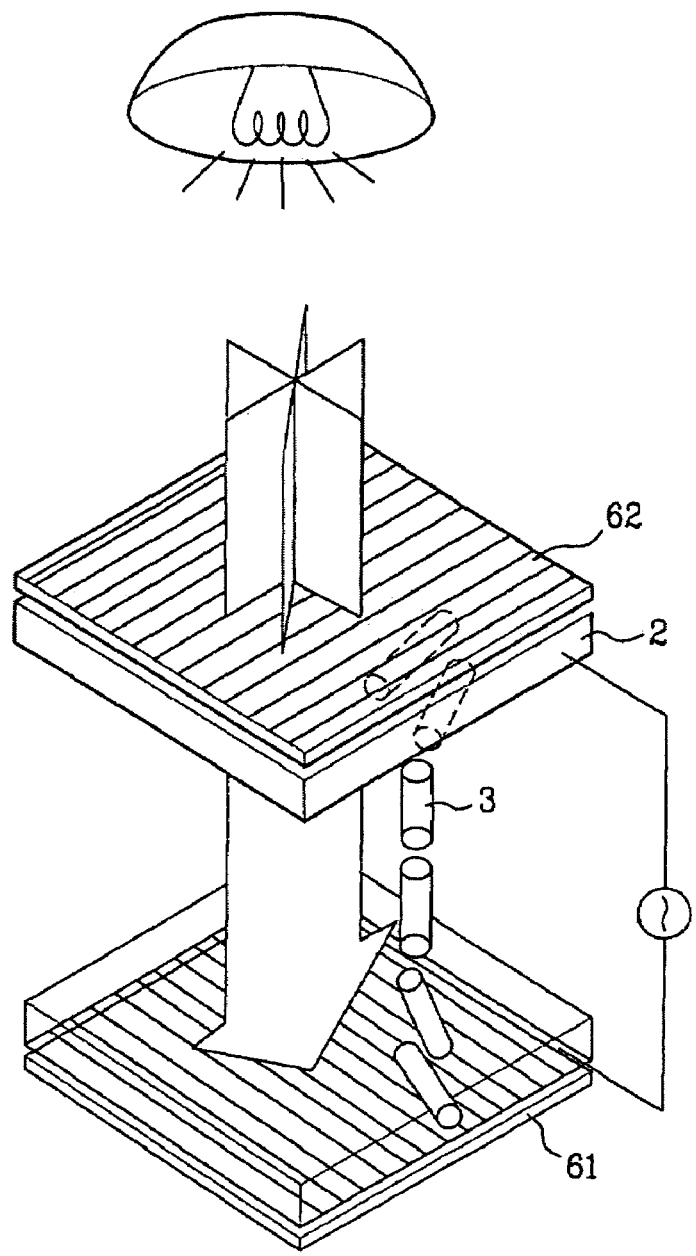
Figure 4:
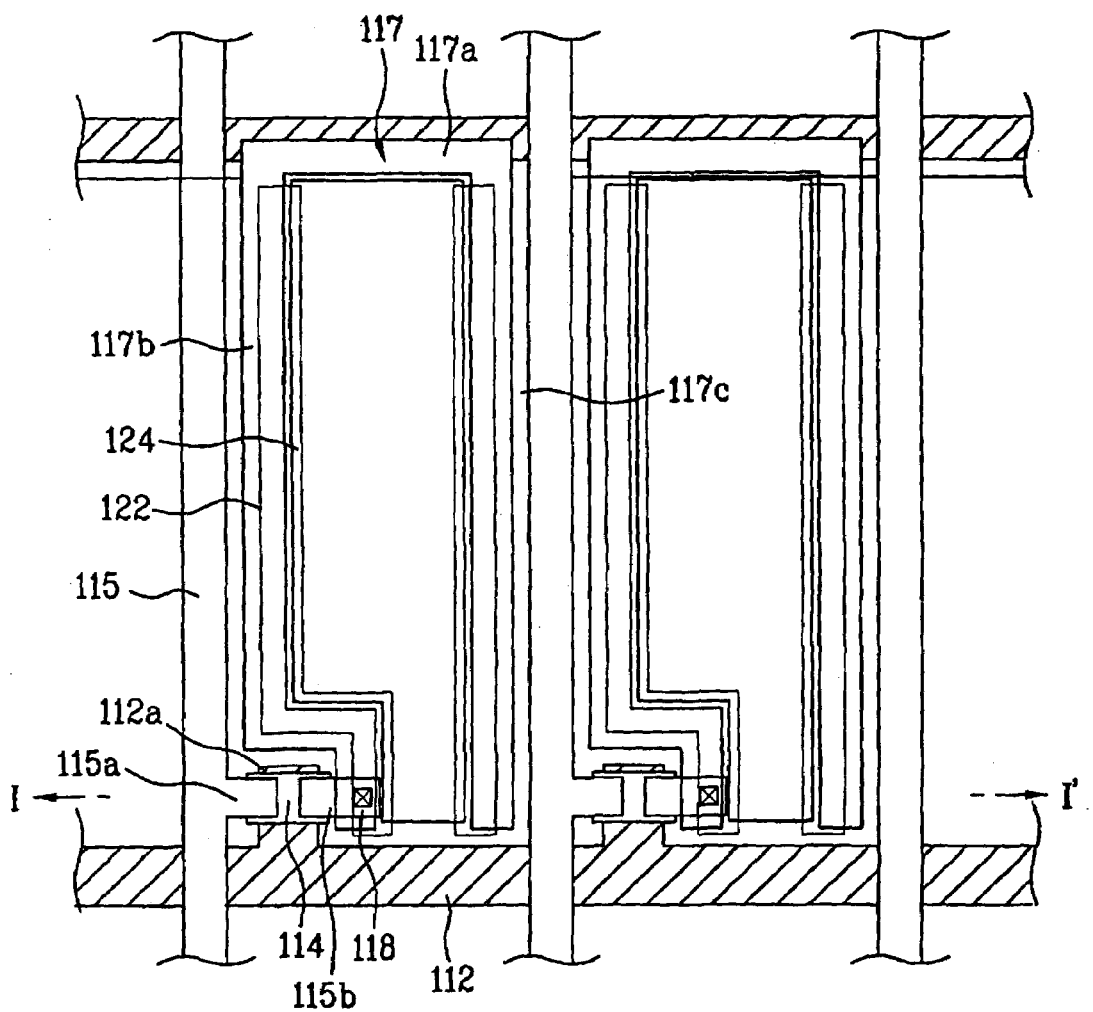
FIG. 4 illustrates a plan view of a display device in accordance with an embodiment of the present invention.
Figure 5:
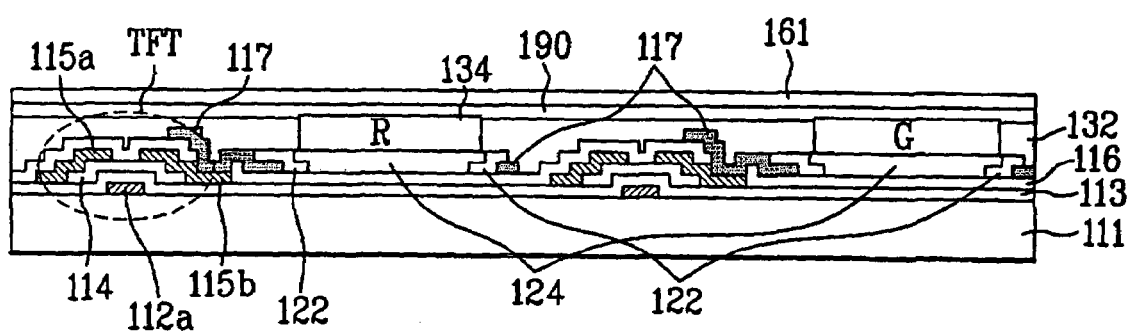
FIG. 5 illustrates a cross-sectional view of a display device across I-I' line in FIG. 4.

FIG. 4 illustrates a plan view of a display device in accordance with an embodiment of the present invention, and FIG. 5 illustrates a cross-sectional view of a display device across line I-I' in FIG. 4.

Figure 6A:
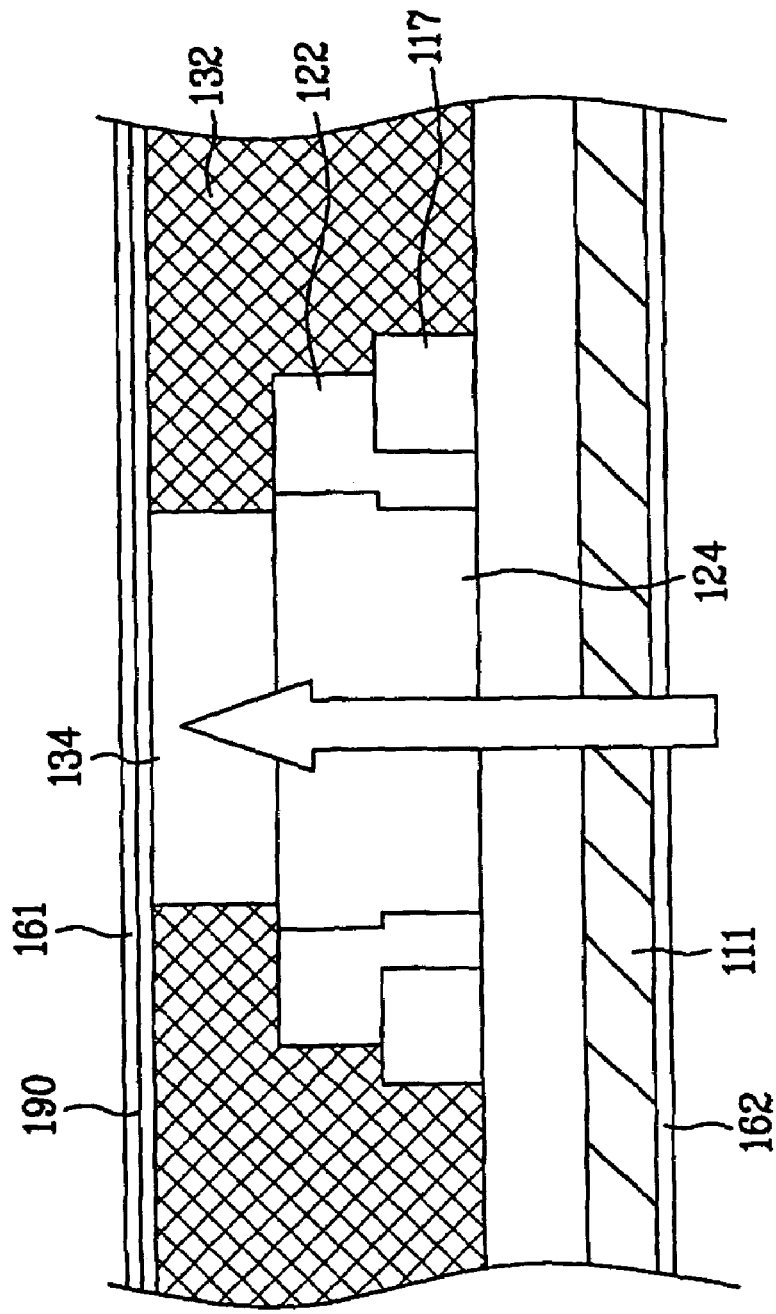
Figure 7A:
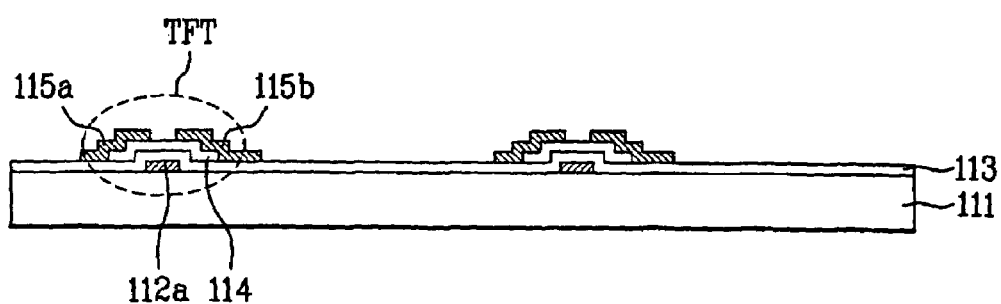
FIGS. 7A to 7F illustrate cross-sectional views showing the steps of a method for fabricating a display device in accordance with an embodiment of the present invention.
Figure 7B:
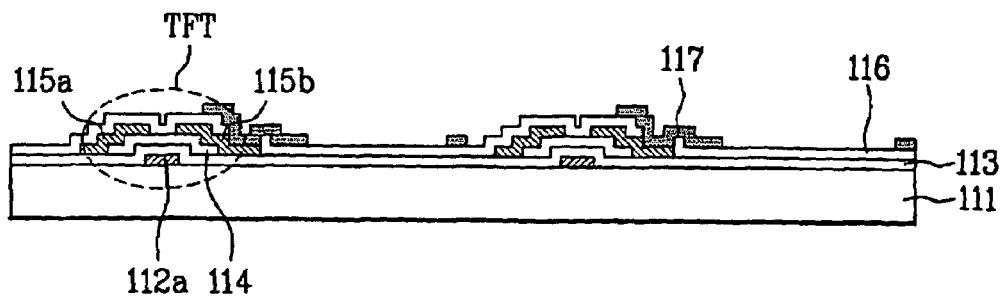
Figure 7C:
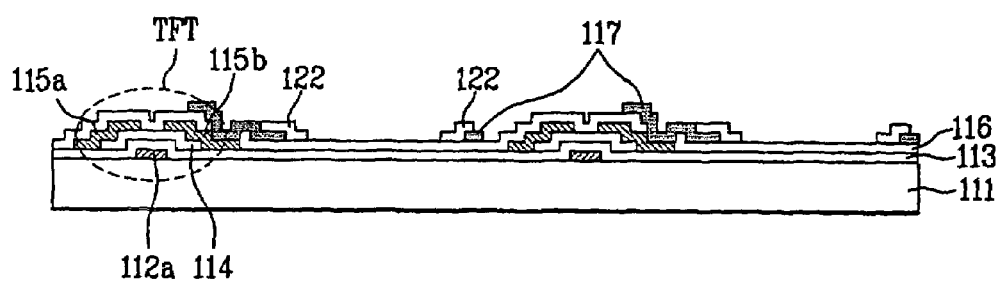
Figure 7D:
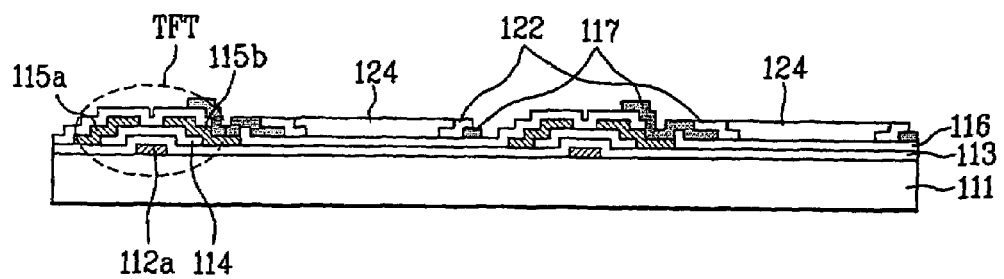
Figure 7E:
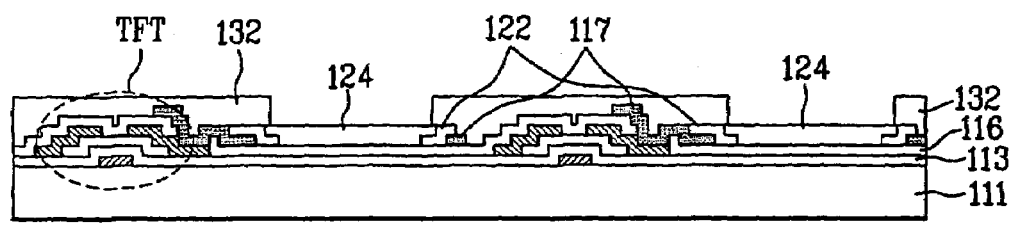
Figure 7F:
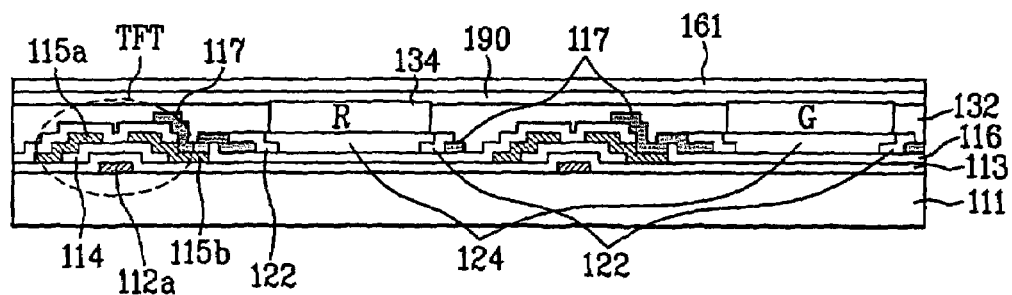
Figure 8:
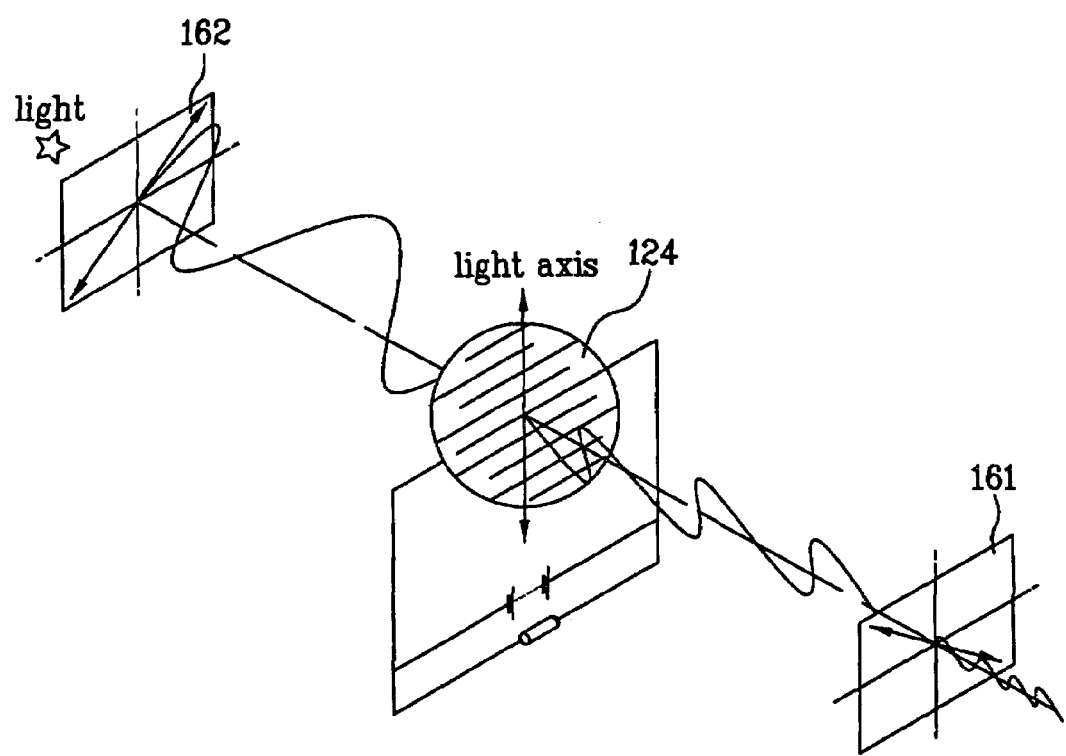
FIG. 8 illustrates a perspective view of a birefringence optical characteristic of a piezoelectric device.

FIGS. 6A and 6B illustrate cross-sectional views each showing the driving principle of a display device in accordance with an embodiment of the present invention, FIGS. 7A to 7F illustrate cross-sectional view showing the steps of a method for fabricating a display device in accordance with an embodiment of the present invention, and FIG. 8 illustrates a perspective view of a birefringence optical characteristic of a piezoelectric device.

Referring to FIGS. 4 and 5, the display device of an embodiment of the present invention includes gate lines 112 and data lines 115 formed on a substrate 111 respectively in vertical and horizontal directions, to define a plurality of unit pixels. A thin film transistor TFT is formed at each crossing of the gate lines 112 and the data lines 115 for switching a data signal on the data lines 115 in response to a scan signal on the gate lines 112. A pixel electrode 117 electrically connected to the drain electrode 115b of the TFT is formed about the circumference of each of the unit pixels. The pixel electrode 117 has an opening at a central portion. A PLZT layer 124 in the opening of each of the unit pixels where no pixel electrode 117 is formed thereon. A PZT layer is positioned between the pixel electrode 117 and the PLZT layer 124. A black matrix layer 132 is formed on the surface except for the PLZT layer 124. A color filter layer 134 is formed on the exposed portion of the PLZT layer 124 between the black matrix layer 132.

The PLZT layer 124 and the PZT layer are formed of a piezoelectric material. A current is generated in the piezoelectric material when a pressure is applied thereon. Conversely, a pressure is generated when a current is applied thereon. PZT (Piezoelectric Lead Zirconate Titanates) and PZLT (Piezoelectric Lead Lanthanum Zirconate Titanates) are examples of the piezoelectric material. The PZT layer or the PLZT layer can be formed of an AB03 type perovskite compound (PbZrx-TiyO3:x+y=1,x≧0, y≧0) including at least lead (Pb), zirconium (Zr), titanium (Ti), and having an A site with a bivalent ion, such as Pb, and a B site with a tetravalent ion, such as Zr, Ti, and so on.

First and second polarizing plates 161, and 162 are attached to the rear surface of the substrate 111 and the entire surface including the color filter layer 134 to display a polarized picture on the screen. Directions of the arrangement of the first, and second polarizing plates 161 and 162 vary with different modes such as a normally black(NB) mode and a normally white(NW) mode.

To reduce a height difference between the color filter layer 134 and the black matrix layer 132, an overcoat layer 190 may be formed on the color filter layer, additionally. However, it is required that the height of the black matrix layer 132 be the same as the height of the color filter layer 134 for securely attaching the first polarizing plate 161 to the outside of the color filter layer 134. Therefore, in order to planarize the entire surface including the color filter layer 134, a protective layer 190 may provided further. The protective layer may be formed by depositing a transparent organic acryl group material on the color filter layer 134 or attaching a transparent protective film thereon.

The thin film transistor TFT includes a gate electrode 112a extending from the gate line 112, a gate insulating film 113 formed over the entire surface of the substrate including the gate electrode 112a, a semiconductor layer 114 formed on the gate insulating film 113 over the gate electrode 112a, and a source electrode 115a and a drain electrode 115b overlapping the opposite sides of a semiconductor layer 114. A protective film 116 is formed over the entire surface of the thin film transistor TFT.

The pixel electrode 117 is formed of a transparent conductive material, such as ITO (Indium Tin Oxide) or IZO (Indium Zinc Oxide), or a low resistance metal, such as the same material as the gate line 112 or the data line 115, about the periphery of the unit pixel such that the central portion of the unit pixel is open. In this instance, the pixel electrode 117 overlaps a predetermined portion of a fore gate line, to form a storage capacitor. That is, the pixel electrode 117 includes a first segment 117a overlapping a fore gate line 112 parallel to the gate line 112, a second segment 117b connected to both one side of the first segment 117a and the drain electrode 115b parallel to the data line 115, and a third segment 117c connected to the other side of the first segment 117a parallel to the data line 115.

The non-transparent PZT layer for applying a pressure generated by a voltage from the pixel electrode 117 should not be formed at the open portion of the pixel electrode 117, but rather between the second and third segments 117c of the pixel electrode 117, and the PLZT layer 124.

The PLZT layer 124 is a transparent layer formed in the open portion of the pixel electrode 117 spaced apart from the pixel electrode 117. Therefore, a birefringence characteristic of the PLZT layer 124 varies with the pressure from the PZT layers 124 at the opposite sides of the PLZT layer 124. Thus, since the birefringence of light is generated by the PZT layer 112 and the PLZT layer 124, liquid crystal is not necessary in the display device. Since the display device of an embodiment of the present invention does not require liquid crystal in the device, a single substrate is used to complete a display device. Further, an alignment film is not necessary for controlling orientation of the liquid crystal.

When a pressure is applied to the PZT layer 122 through the pixel electrode 117, a physical pressure generated in a short axis direction of the PZT layer 122, and transmitted to the PLZT layer 124, thereby changing the birefringence characteristic of the PLZT layer 124. In this instance, a voltage is indirectly applied to the PLZT layer 124 through the PZT layer 122 since a high voltage is required for the PLZT layer to be served as an optical shutter. That is, a junction structure of the PZT layer 122 and the PLZT layer 124 can be used to realize a 90° light turning characteristic when applying a low voltage tension of the PZT layer 122 to the PLZT layer in a direction. Normally, this phenomenon occurs only at a high voltage.

Referring to FIG. 6A, the first and second polarizing plates 161 and 162 are attached to the overcoat layer 190 and the rear surface of the substrate 111. Referring to FIG. 8, the polarizing axes of the first and second polarizing plates 161 and 162 are perpendicular to each other. The polarizing axis of the first polarizing plate is set to be +45° from the horizontal direction while the polarizing axis of the second polarizing plate is set to be −45° from the horizontal direction.

If no voltage is applied to the display device, the polarized light passing through the second polarizing plate 161 can not pass through the PLZT layer 124 and the second polarizing plate 162, the display device displays a black state (see FIG. 6A). When a voltage higher than a certain level is applied to the display device, the voltage is transmitted to the PZT layer 122 through the pixel electrode 117, to generate a physical pressure in a short axis direction of the PZT layer, which changes the birefringence characteristic of the PLZT layer 124 such that a polarized light passing through the second polarizing plate 162 turns from 0° to 90°, and passes through the first polarizing plate 161 (see FIGS. 6B and 8). That is, as the birefringence characteristic of the PLZT layer 124 varies with the voltage applied to the pixel electrode 117, to control the quantity of light passing through the polarizing plate 161, a picture can be displayed.

The picture displays a full color spectrum in accordance with the color filter layer having the polarized light passed through. When all pixel voltages are turned on, white color is displayed on the screen.

The device utilizes an optical characteristic of the PLZT group material such that an optical axis becomes the same as one of the directions of an electric field and a pressure. A high voltage is required to change the optical characteristic of the PLZT group material. Thus, the electric field is indirectly applied to the PLZT group material through the PZT group material to change the optical axis.

A method for fabricating the foregoing display device will be described in detail as follows.

Referring to FIG. 7A, after depositing a low resistance metal having a low specific resistance on a substrate 111 for preventing delay of signal, the metal is patterned to form a plurality of gate lines (shown as 112 in FIG. 5) and gate electrodes 112a. Next, after an inorganic insulating material, such as silicon oxide (SiOx) or Silicon Nitride (SiNx) is deposited on the entire surface including the gate line 112 by using PECVD (plasma enhanced chemical vapor deposition) to form a gate insulating film. Amorphous silicon (a-Si:H) is then deposited at a high temperature over the entire surface including the gate insulating film and patterned to form a semiconductor layer 114 over the gate electrode 112a. Then, a low resistance metal is deposited and patterned over the entire surface including the semiconductor layer to form a plurality of data lines 115 and source/drain electrodes 115a and 115b. The metal of the gate line and the metal of the data line may be selected from copper (Cu), aluminum (Al), aluminum alloy (AlNd:aluminum neodymium), molybdenum (Mo), chrome (Cr), titanium (Ti), tantalum (Ta), molybdenum-tungsten (MoW), and so on.

Next, referring to FIG. 7B, an organic insulating material, such as BCB (Benzocyclobutene), acryl resin, or so on, is coated, or an inorganic insulating material, such as SiNx, SiOx, or so on, is deposited over the entire surface including the data line 115 to form a protective film 116. Then, a portion of the protective film 116 is removed to form a contact hole 118 in the drain electrode 115b. A conductive layer is deposited and patterned over the entire surface including the protective film to form a pixel electrode 117 that is electrically connected to the drain electrode 115b through the contact hole 118. The pixel electrode 117 may be formed of a material the same as the material of the data line and the gate line, as well as a transparent conductive material, such as ITO (Indium Tin Oxide) and IZO (Indium Zinc Oxide).

In this instance, the pixel electrode 117 is formed only about the periphery of the unit pixel extending from a fore gate line to form a storage capacitor with the fore gate line. That is, the pixel electrode 117 includes a first segment 117a overlapping the fore gate line 112 in parallel to the gate line 112, a second segment 117b connected to a side of the first segment 117a parallel to the data line 115 and the drain electrode 115b, and a third segment 117c connected to the other side of the first segment 117a parallel to the data line 115.

Next, referring to FIG. 7C, PZT layers 122 are formed at the opposite edges of the unit pixel in parallel to the data line overlapping the second segment and the third segment of the pixel electrode 117. A portion of the PZT layer 122 overlapping the pixel electrode 117 has a predetermined voltage applied thereto from the pixel electrode 117.

Then, referring to FIG. 7D, a PLZT layer 124 is formed at inner sides of the PZT layers 122 formed at the opposite edges of the unit pixels. The PLZT layer 124 overlaps edge portions of the PZT layers 122 and receives a pressure generated at the PZT layers 122, thereby changing the birefringence characteristic. The PZT layer 122 and the PLZT layer 124 may be formed by a sol-gel method, or a sputtering method using a target formed by the sol-gel method.

In the sol-gel method, a PZT group or a PLZT group material of a sol state is spin-coated for about 2 to 8 minutes at about 3000 rpm, and dried for about 2 to 8 minutes at a temperature in the rage of about 50° C. to 120° C. in an electric oven. Thereafter, it is subjected to pyrolysis for 5 to 15 minutes at a temperature in the range of about 300° to 400° C. and subjected to pre-annealing for about 15 to 25 minutes at a temperature in the range of about 400° C. to 800° C. After repeating above steps for a few times, the coated PZT group or PLZT group material is annealed for about ½ to one and ½ hours at a temperature in the range of about 400° C. to 1000° C. to complete the formation of a piezoelectric material film. Such a sol-gel method has advantages in that it is suitable for a large area, low fabrication cost, and accurate composition control.

With regard to the sputtering method, a target of the PZT group material, or the PLZT group material is mounted on a sputtering apparatus to deposit the PZT group material or the PLZT group material on a substrate by sputtering the target.

Referring to FIG. 7E, a black matrix layer 132 is formed over the entire surface of the substrate except for the PLZT layer 124. The black matrix layer 132 is deposited by sputtering a metal, such as a chrome oxide (CrOx) having an optical density higher than about 3.5, or chrome, or formed by coating a carbon group organic material, and patterning by photolithography. The black matrix layer 132 is formed to correspond to the gate lines, data lines, circumferences of the unit pixels, and regions of the thin film transistors for preventing light leakage from the regions where an electric field is unstable. Then, R, G, B color filter layers 134 are formed on an exposed portion of the PLZT layer 124 between the black matrix layer 132.

A method for fabricating the color filter layer includes the steps of coating a color resist, a photosensitive material on the substrate, soft-baking the color resist coated at an elevated temperature, putting a photomask on the soft-baked color resist, and exposing the color resist using the same pattern as the photomask, and developing and patterning the exposed color resist, and hard-baking the color resist at a temperature higher than the soft-baking temperature. After the color filter layer is formed, an overcoat layer 190 may be formed over the entire surface including the color filter layer 134, for planarizing the entire surface including the color filter layer 134. The overcoat layer 190 may be formed by coating a transparent organic acryl group material, exposing, and thermosetting, or by attaching a transparent protective film, such as a lamination film.

First, and second polarizing plates 161, and 162 are attached to the rear surfaces of the substrate 111 and the overcoat layer 190 such that polarizing axes thereof are perpendicular to each other, to complete the fabrication of a display device. Thus, the display device of an embodiment of the present invention has a simplified fabrication process because many processes are eliminated as compared to the conventional method. The eliminated process steps include an alignment film formation step, a liquid crystal layer formation step, a sealant printing step and a spacer scattering step for bonding the two substrates.

As described above, the display device and the method for fabricating the same has several advantages. First, a display device can be manufactured without using liquid crystal and an alignment film by employing a piezoelectric material. Second, by employing the piezoelectric material, a TFT array pattern and a color filter layer can be formed on one substrate at the same time, thereby reducing production cost and fabrication time. Third, since liquid crystal is not used at all, problems in view angle, response speed, residual image, and light leakage can be overcome. Fourth, since the liquid crystal is not used at all, there is no need for a separate step of forming an alignment film and defects related to this step are reduced. Fifth, the display device of an embodiment of the present invention has a simple fabrication process because many manufacturing process steps, such as an alignment film formation step, a liquid crystal layer formation step, a sealant printing step, and a spacer scattering step for bonding the two substrates, can be eliminated from the overall manufacturing process.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display device comprising:
    a plurality of gate lines and a plurality of data lines crossing each other on a substrate to define a pixel region;
    a thin film transistor at each crossing portion of the gate lines and data lines;
    a pixel electrode about a circumference of the pixel region and having an opening at a central portion of the pixel region, the pixel electrode electrically connected to the thin film transistor;
    a piezoelectric lead lanthanum zirconate titanates (PLZT) layer in the opening of the pixel region, wherein a birefringence characteristic of the PLZT layer varies with a voltage applied to the pixel electrode;
    a piezoelectric lead zirconate titanates (PZT) layer between the pixel electrode and the PLZT layer, wherein when the voltage applied to the pixel electrode is transmitted to the PZT layer, a physical pressure generates in the PZT layer and transmits to the PLZT layer; and
    a protective film on a second side of the substrate including a color filter layer and a black matrix layer.

2. The display device according to claim 1, wherein the black matrix layer is formed over an entire surface of the substrate except for the PLZT layer, and the color filter layer is formed on the PLZT layer.

3. The display device according to claim 2, further comprising:
    a first polarizing plate attached to a first side of the substrate, and
    a second polarizing plate attached to the second side of the substrate including the color filter layer.

4. The display device according to claim 1, wherein the PZT layer is between the pixel electrode and the PLZT layer in a direction parallel to the data lines.

5. The display device according to claim 1, wherein the pixel electrode includes;
    a first segment parallel to the gate line and overlapping one of the gate lines,
    a second segment parallel to one of the data lines and connected to both one side of the first segment and the drain electrode, and
    a third segment parallel to one of the data lines, and connected to the other side of the first segment.

6. The display device according to claim 5, wherein the PZT layer is between the second and third segments of the pixel electrode and the PLZT layer.

7. The display device according to claim 1, wherein the pixel electrode is formed of a low resistance material.

8. The display device according to claim 1, wherein the pixel electrode is formed of a transparent material.

9. The display device according to claim 1, wherein the pixel electrode is spaced apart from the PLZT layer.

10. The display device according to claim 1, wherein at least one of the PZT layer and the PLZT layer is formed of an $ABO_3$ type perovskite compound ($PbZr_xTi_yO_3: x+y=1$, $x \geq 0, y \geq 0$) including at least lead (Pb), zirconium (Zr), titanium (Ti).

11. The display device according to claim 10, wherein the $ABO_3$ type perovskite compound has an A site with a bivalent ion and a B site with a tetravalent ion.

12. The display device according to claim 11, wherein the bivalent ion includes Pb and the tetravalent ion includes one of Zr and Ti.

13. A method for fabricating a display device comprising:
    forming a plurality of gate lines and a plurality of data lines perpendicular to each other on a substrate to define a pixel region;
    forming a thin film transistor at each crossing of the gate lines and the data lines;
    forming a protective film on an entire surface including the thin film transistor;
    forming a pixel electrode about a periphery of the pixel region such that the pixel region has an open portion at a central portion thereof, the pixel electrode is connected to the thin film transistor;
    forming a PZT layer on the protective film adjacent to the pixel electrode and to overlap a portion of the pixel electrode; and
    forming a PLZT layer at the opened portion of the pixel electrode.

14. The method according to claim 13, further comprising:
    forming a black matrix layer over an entire surface of the substrate and expose at least a portion of the PLZT layer; and
    forming a color filter layer on the exposed PLZT layer.

15. The method according to claim 14, further comprising:
    forming a first polarizing plate on a first surface of the substrate; and
    forming a second polarizing plate on a second surface including the color filter layer.

16. The method according to claim 14, further comprising:
    forming a protective layer over an entire surface of the substrate including the color filter layer and the black matrix layer.

17. The method according to claim 14, wherein the black matrix layer is formed of an organic insulating material.

18. The method according to claim 14, wherein the black matrix layer is formed by sputtering one of chrome oxide (CrOx) having an optical density of at least 3.5 and chrome.

19. The method according to claim 14, wherein the black matrix layer is formed by sequentially coating and patterning a carbon group organic material.

20. The method according to claim 13, wherein the PZT layer is formed between the pixel electrode and the PLZT layer in a direction parallel to one of the data lines.

21. The method according to claim 13, wherein the pixel electrode includes;
    a first segment parallel to the gate lines and overlapping one of the gate lines,
    a second segment parallel to one of the data lines, and connected to both one side of the first segment and the drain electrode, and
    a third segment parallel to one of the data lines, and connected to the other side of the first segment.

22. The method according to claim 21, wherein the PZT layer is between the second and third segments of the pixel electrode and the PLZT layer.

23. The method according to claim 13, wherein the pixel electrode is formed of a low resistance material.

24. The method according to claim 13, wherein the pixel electrode is spaced apart from the PLZT layer.

25. The method according to claim 13, wherein the forming PLZT layer and the PZT layer includes;
coating and drying one of a PZT group material and a PLZT group material in a sol state,
causing the dried one of the PZT group material and the PLZT group material to a pyrolysis reaction,
pre-annealing the pyrolysised the one of the PZT group material and the PLZT group material, and
repeating the above processes to complete an annealing.

26. The method according to claim 13, wherein at least one of the PLZT layer and the PZT layer is formed by sputtering using a target formed of one of PLZT layer and PZT layer.

27. The method according to claim 13, wherein the PZT layer and the PLZT layer are formed of an $ABO_3$ type perovskite compound ($PbZr_xTi_yO_3$: $x+y=1$, $x \geqq 0, y \geqq 0$) including at least Pb, Zr, Ti.

28. The method according to claim 27, wherein the $ABO_3$ type perovskite compound has an A site with a bivalent ion and a B site with a tetravalent ion.

29. The method according to claim 28, wherein the bivalent ion includes Pb, and the tetravalent ion includes one of Zr and Ti.

* * * * *